(12) United States Patent
Hefner et al.

(10) Patent No.: US 10,858,116 B2
(45) Date of Patent: Dec. 8, 2020

(54) PUSHER ROTORCRAFT DRIVETRAIN

(71) Applicant: Textron Innovations Inc., Fort Worth, TX (US)

(72) Inventors: Levi C. Hefner, Wichita, KS (US); Frank B. Stamps, Colleyville, TX (US); Alan C. Ewing, Keller, TX (US); Jaret F. Burgess, Fort Worth, TX (US); Carey W. Cannon, Colleyville, TX (US)

(73) Assignee: TEXTRON INNOVATIONS INC., Fort Worth, TX (US)

( * ) Notice: Subject to any disclaimer, the term of this patent is extended or adjusted under 35 U.S.C. 154(b) by 187 days.

(21) Appl. No.: 16/120,676

(22) Filed: Sep. 4, 2018

(65) Prior Publication Data
US 2020/0070996 A1  Mar. 5, 2020

(51) Int. Cl.
| | |
|---|---|
| *B64D 35/04* | (2006.01) |
| *B64C 27/26* | (2006.01) |
| *B64C 27/14* | (2006.01) |
| *B64C 27/82* | (2006.01) |
| *B64C 11/30* | (2006.01) |
| *B64C 27/06* | (2006.01) |

(52) U.S. Cl.
CPC .............. *B64D 35/04* (2013.01); *B64C 11/30* (2013.01); *B64C 27/06* (2013.01); *B64C 27/14* (2013.01); *B64C 27/26* (2013.01); *B64C 27/82* (2013.01); *B64C 2027/8236* (2013.01)

(58) Field of Classification Search
CPC ......... B64D 35/04; B64C 27/26; B64C 27/14; B64C 27/82; B64C 11/30; B64C 2027/8236; B64C 2027/8281; B64C 2027/8227
See application file for complete search history.

(56) References Cited

U.S. PATENT DOCUMENTS

| | | | |
|---|---|---|---|
| 3,977,812 A * | 8/1976 | Hudgins | ................. B64C 27/12 416/123 |
| 5,722,522 A | 3/1998 | Henry | |
| D730,803 S | 6/2015 | Hoover et al. | |
| 9,701,406 B2 * | 7/2017 | Robertson | ........... B64C 29/0033 |
| 10,647,422 B2 * | 5/2020 | Bredenbeck | ............ B64C 27/82 |
| 2006/0269413 A1 * | 11/2006 | Cotton | .................... B64C 27/82 416/170 R |

(Continued)

OTHER PUBLICATIONS

Bell Helicopter, A Textron Company, "Chapter 63—Main Rotor Drive System," BHT-407-IPB, Export Classification C, ECCN EAR99, Sep. 20, 2016, Rev. 10, 83 pages.

(Continued)

*Primary Examiner* — Brian M O'Hara
*Assistant Examiner* — Keith L Dixon
(74) *Attorney, Agent, or Firm* — Patent Capital Group (57) ABSTRACT

A pusher rotorcraft is provided in one example embodiment and may include at least one engine in mechanical communication with a drop-down gearbox; a driveshaft in mechanical communication with the drop-down gearbox, a main rotor gearbox, and a tail system gearbox; a main rotor system in mechanical communication with the main rotor gearbox; an anti-torque system in mechanical communication with the tail system gearbox; and a pusher propeller system in mechanical communication with the tail system gearbox.

19 Claims, 7 Drawing Sheets

(56) References Cited

U.S. PATENT DOCUMENTS

2014/0191079 A1    7/2014  Ehinger et al.
2016/0207618 A1*   7/2016  Darrow, Jr. ......... F16H 57/0416
2017/0275011 A1*   9/2017  Luszcz .................... B64C 27/82

OTHER PUBLICATIONS

Bell Helicopter, A Textron Company, "Chapter 65—Tail Rotor Drive System," BHT-407-IPB, Export Classification C, ECCN EAR99, Mar. 14, 2014, Rev. 7, 24 pages.

* cited by examiner

PUSHER ROTORCRAFT DRIVETRAIN

TECHNICAL FIELD

This disclosure relates in general to the field of aircraft and, more particularly, though not exclusively, to a pusher rotorcraft drivetrain.

BACKGROUND

There are numerous considerations involved in the design of aircraft, such as rotorcraft, including size, weight, power efficiency, fuel efficiency, noise, vibration, structural loads, and so forth. In many cases, however, it may be challenging to improve certain aspects of an aircraft without disrupting other aspects. For example, drivetrain design for aircraft rotor systems can implicate numerous performance considerations and is often an extremely challenging aspect of aircraft design.

SUMMARY

According to one aspect of the present disclosure, a rotorcraft may be provided and may include at least one engine in mechanical communication with a drop-down gearbox; a driveshaft in mechanical communication with the drop-down gearbox, a main rotor gearbox, and a tail system gearbox; a main rotor system in mechanical communication with the main rotor gearbox; an anti-torque system in mechanical communication with the tail system gearbox; and a pusher propeller system in mechanical communication with the tail system gearbox. In some cases, the rotorcraft may further include a fuselage that comprises a wing. In some instances, the wing may comprise one or more moveable portions.

The drop-down gearbox may include an overrunning clutch in mechanical communication with the drive shaft. In some cases, the overrunning clutch may be a sprag clutch. The pusher propeller system may include a plurality of adjustable pitch propeller blades.

In some cases, the tail system gearbox may include an input pinion gear in mechanical communication with the driveshaft; a spiral bevel gear in mechanical communication with a first output shaft; and an output pinion gear in mechanical communication with a second output shaft. The first output shaft may be operable to rotate the anti-torque system and the second output shaft may be operable to rotate the pusher propeller system.

In some cases, the rotorcraft may include a clutch in mechanical communication with the driveshaft between the drop-down gearbox and the main rotor gearbox. In still some cases, the rotorcraft may include a clutch in mechanical communication with the driveshaft between the drop-down gearbox and the tail system gearbox.

According to another aspect of the present disclosure, a method may be provided and may include providing at least one engine in mechanical communication with a driveshaft of a pusher rotorcraft, wherein the driveshaft extends between a main rotor gearbox and a tail system gearbox; providing torque for the driveshaft, wherein the torque is provided for the driveshaft at a location of the driveshaft between the main rotor gearbox and the tail system gearbox; and adjusting forward thrust for the pusher rotorcraft based, at least in part, on torque provided to a pusher propeller system in mechanical communication with the tail system gearbox. Torque may be provided for the driveshaft by an overrunning clutch in mechanical communication with the driveshaft and at least one engine.

The main rotor gearbox may be in mechanical communication with a main rotor system that includes a plurality of rotor blades. In some cases, the method may include operating the main rotor system in an autorotation state. In some cases, torque provided to the main rotor gearbox may be decreased when the main rotor system is operating in the autorotation state. In still some cases, torque provided to the pusher propeller system may be increased when the main rotor system is operating in the autorotation state. In still some cases, the method can include adjusting lift for the pusher rotorcraft based, at least in part, on a wing provided for the pusher rotorcraft.

According to another aspect of the present disclosure, a rotorcraft drivetrain may be provided and may include a first gearbox in mechanical communication with at least one engine; a second gearbox in mechanical communication with a main rotor system; a third gearbox in mechanical communication with an anti-torque system and a pusher propeller system; and a driveshaft, wherein the driveshaft is in mechanical communication with the first gearbox, the second gearbox, and the third gearbox. The first gearbox may provide torque for the driveshaft at a location of the driveshaft between the second gearbox and the third gearbox.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as 'above', 'below', 'upper', 'lower', 'top', 'bottom', or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature) of an element, operations, and/or conditions, the phrase 'between X and Y' represents a range that includes X and Y.

Additionally, as referred to herein in this Specification, the terms 'forward', 'aft', 'inboard', and 'outboard' may be used to describe relative relationship(s) between components and/or spatial orientation of aspect(s) of a component or components. The term 'forward' may refer to a spatial direction that is closer to a front of an aircraft relative to another component or component aspect(s). The term 'aft' may refer to a spatial direction that is closer to a rear of an aircraft relative to another component or component aspect(s). The term 'inboard' may refer to a location of a component that is within the fuselage of an aircraft and/or a spatial direction that is closer to or along a centerline of the aircraft or other point of reference relative to another component or component aspect, wherein the centerline runs between the front and the rear of the aircraft. The term 'outboard' may refer to a location of a component that is outside the fuselage of an aircraft and/or a spatial direction that farther from the centerline of the aircraft or other point of reference relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Figure 1:
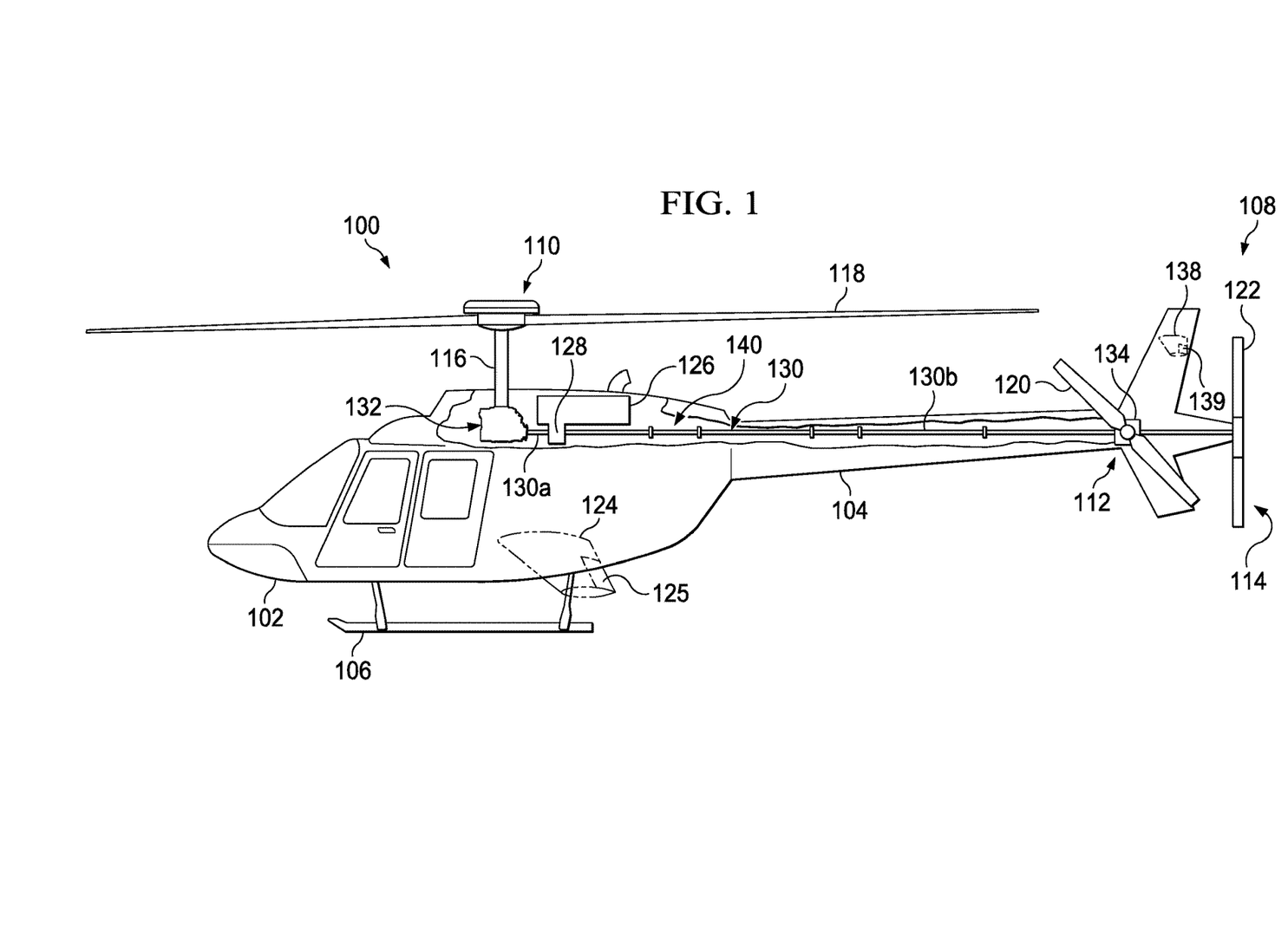
FIG. 1 is a simplified diagram of an example pusher rotorcraft, in accordance with certain embodiments.

Referring to FIG. 1, FIG. 1 illustrates an example embodiment of a pusher rotorcraft 100, in accordance with certain embodiments. FIG. 1 portrays a side view of pusher rotorcraft 100. Pusher rotorcraft 100 may include a fuselage 102, an empennage 104, landing gear 106, a tail structure 108, a main rotor system 110, a tail rotor or anti-torque system 112, and a pusher propeller system 114. Main rotor system 110 may include a rotor mast 116 and plurality of rotor blades 118. Anti-torque system 112 may include a plurality of rotor blades 120. Pusher propeller system 114 may include a plurality of propeller blades 122. The fuselage 102 is the main body of pusher rotorcraft 100 and may include a cabin (e.g., for crew, passengers, and/or cargo) and/or may house certain mechanical and electrical components (e.g., engine(s), transmissions, flight controls, etc.). In the illustrated embodiment, tail structure 108 may be used as a horizontal stabilizer.

In some embodiments, pusher rotorcraft 100 may include wings 124 provided for fuselage 102. In some embodiments, wings 124 may include one or more moveable control surfaces 125 (e.g., ailerons, flaps, and/or flaperons). In still some embodiments, pusher rotorcraft 100 may include one or more horizontal stabilizer(s) 138 provided for tail structure 108. In some embodiments, horizontal stabilizer(s) 138 may include elevator(s) 139. It is to be understood that the locations of wings 124 and horizontal stabilizer(s) 138 are provided for illustrative purposes only and are not meant to limit the broad scope of the present disclosure. Wings 124 and/or horizontal stabilizer(s) 138 may be provided in any suitable location, configuration, etc. as would be appreciated by one of ordinary skill in the art.

In some embodiments, the pitch of rotor blades 118 can be managed and/or adjusted using collective control and/or cyclic control to selectively control direction, thrust, and/or lift of pusher rotorcraft 100. During collective control, all of the rotor blades are collectively pitched together (e.g., the pitch angle is the same for all blades), which effects overall thrust and lift. During cyclic control, the pitch angle of each of the rotor blades varies depending on where each blade is within a cycle of rotation (e.g., at some points in the rotation of rotor blades 118 about the rotational axis of rotor mast 116 the pitch angle is not the same for all blades), which can effect direction of travel. The pitch of rotor blades 120 and the pitch of propeller blades 122 may also be managed and/or adjusted, in various embodiments. The pitch of rotor blades 120 may be managed and/or adjusted to selectively control direction of pusher rotorcraft 100. The pitch of propeller blades 122 of pusher propeller system 114 may be managed and/or adjusted to selectively control forward thrust of pusher rotorcraft 100. For embodiments in which wings 124 may be provided for pusher rotorcraft 100, the wings 124 may provide lift for the pusher rotorcraft 100 during forward flight.

Pusher rotorcraft 100 may include one or more engine(s) 126 in mechanical communication with a drivetrain 140 that may include a drop-down gearbox 128, a driveshaft 130, a main rotor gearbox 132, and a tail system gearbox 134 to provide a rotational force or torque to main rotor system 110, anti-torque system 112, and pusher propeller system 114. Driveshaft 130 may include a main rotor driveshaft portion 130a and a tail system driveshaft portion 130b. Driveshaft 130 may include intermediate sections coupled together using couplings (not labeled), as would be appreciated by one of ordinary skill in the art. In some embodiments, the diameter of main rotor driveshaft portion 130a and the diameter of tail system driveshaft portion 130b may be the same; however, in other embodiments, they may be different.

Drop-down gearbox 128 may include a gear train (e.g., spur or straight-cut gears, spiral spur gears, etc.) in mechanical communication with an output of engine(s) 126 (e.g., an output shaft) and a unidirectional (e.g., one-way) overrunning clutch (sometimes referred to as a freewheel clutch) in order to transfer torque from engine(s) 126 to driveshaft 130 (e.g., to main rotor driveshaft portion 130a and tail system driveshaft portion 130b). In at least one embodiment, the overrunning clutch may be a sprag clutch that may provide a one-way torque to driveshaft 130. As referred to herein in this Specification, the terms 'drivetrain', 'pusher drivetrain', and 'pusher rotorcraft drivetrain' may be used interchangeably.

In some cases, it may be useful to route the majority of power output from the engine(s) to the tail system gearbox of a pusher rotorcraft during flight while managing the collective pitch of the main rotor system to be zero (flat) or slightly negative (slightly nose down) in order to operate the main rotor system in an autorotation state. In general, autorotation may refer to the state of flight in which the main rotor system is being turned by the action of air moving up through the rotor blades, as with an autogyro or gyrocopter, rather than engine(s) power driving the rotor system.

Cases in which it may be useful to operate the main rotor system in an autorotation state may include high forward speed flight for a pusher rotorcraft in which the engine(s) may provide increased power to the pusher propeller system while the main rotor system is unpowered or absorbs less power from the engine. Stated differently, torque provided to the pusher propeller system from the engine(s) may be increased while torque provided to the main rotor system from the engine(s) may be decreased when the main rotor system is operated in an autorotation state, which may provide for the ability to achieve high forward speed flight for a pusher rotorcraft (e.g., pusher rotorcraft 100).

Some pusher rotorcraft drivetrain configurations involve transferring torque from an engine to a main rotor gearbox via a first driveshaft and then transferring torque through the main rotor gearbox gear mesh and from the main rotor gearbox to a tail rotor gearbox via a second driveshaft. While such a configuration is possible, power is lost as torque is transferred from the engine to the main rotor gearbox, through the gear mesh of the main rotor gearbox, and out of the main rotor gearbox to the tail rotor gearbox.

In various embodiments as discussed herein, pusher rotorcraft 100 drivetrain 140 may advantageously provide for the ability to route torque or power output from engine(s) 126 directly to main rotor gearbox 132 and/or to tail system gearbox 134 based on the configuration of engine(s) 126, drop-down gearbox 128, and driveshaft 130 in which torque is provided to the driveshaft 130 at a location of the driveshaft 130 that is between the main rotor gearbox 132 and the tail system gearbox 134. For example, depending on aerodynamic and/or operational loads that that may be experienced by any combination of the main rotor system 110, the anti-torque system 112, and/or the pusher propeller system 114, output power generated by engine(s) 126 may be routed forward (via drop-down gearbox 128, main rotor driveshaft portion 130a, and main rotor gearbox 132) to the main rotor system 110 and/or backward (via drop-down gearbox 128, tail system driveshaft portion 130b, and tail system gearbox 134) to the anti-torque system 112 and/or the pusher propeller system 114.

In at least one embodiment, the amount of power routed to any of the main rotor system 110, the anti-torque system 112, and/or the pusher propeller system 114 may depend on the pitch of the blades of the respective systems. For example, in some cases a rotor/propeller system in which the blades may have a flat (zero) pitch (e.g., operated in an autorotation state) may absorb less power than a rotor/propeller system in which the blades have a non-zero pitch.

Embodiments described throughout this disclosure may provide numerous technical advantages including, but not limited to, providing a pusher rotorcraft drivetrain that may route torque generated by one or more engine(s) directly to any combination of a main rotor gearbox and/or a tail system gearbox using a drop-down gearbox positioned at a driveshaft location that is between the main rotor gearbox and the tail system gearbox, which reduce power losses from the engine(s) to the tail system gearbox (and the pusher propeller system) when the main rotor system may be operated in an autorotation state; thereby making the pusher rotorcraft more efficient.

Example embodiments associated with providing a drivetrain for a pusher rotorcraft are described below with more particular reference to the remaining FIGURES. It should be appreciated that example pusher rotorcraft 100 of FIG. 1 is merely illustrative of a variety of aircraft in which a pusher drivetrain may be used in accordance with embodiments of the present disclosure. Other aircraft in which a pusher drivetrain may be used can include, for example, fixed wing airplanes, hybrid aircraft, unmanned aircraft, a variety of helicopter configurations, and drones, among other examples.

Figure 2A:
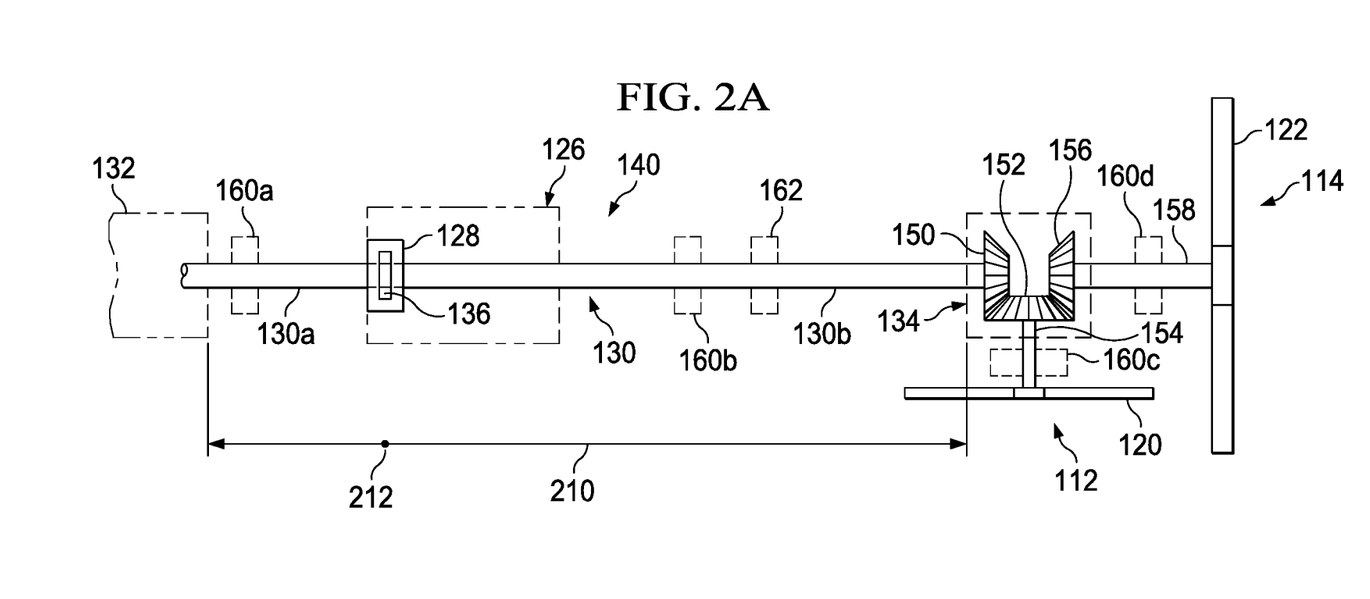
FIGS. 2A-2B are a simplified schematic diagram illustrating example details that may be associated with a drivetrain of the pusher rotorcraft of FIG. 1, in accordance with certain embodiments.
Figure 2B:
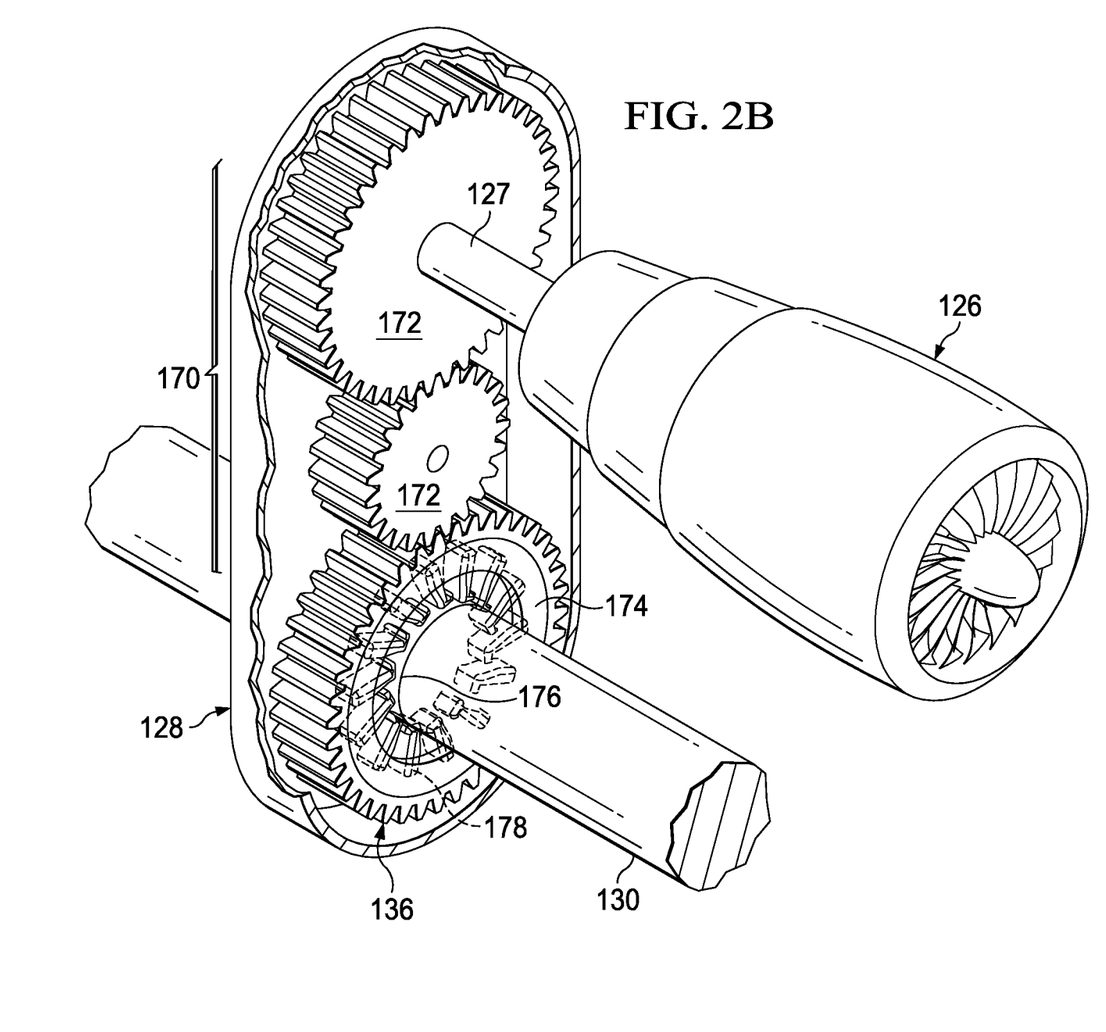

Referring to FIGS. 2A-2B, FIGS. 2A-2B are simplified schematic diagrams illustrating example details that may be associated with drivetrain 140 for pusher rotorcraft 100, in accordance with certain embodiments. As illustrated in the embodiment of FIG. 2A, driveshaft 130 may extend through drop-down gearbox 128 and an overrunning clutch 136 (e.g., a sprag clutch) configured for drop-down gearbox 128. During operation, torque provided by engine(s) 126 can be transferred to the driveshaft 130 via a gear train (not shown) that is in mechanical communication with an output (not shown) of engine(s) 126 and overrunning clutch 136. Driveshaft 130 may have an overall length 210 between main rotor gearbox 132 and tail system gearbox 134. The overall length 210 of driveshaft 130 may vary depending on application, implementation, rotorcraft size, etc., in various embodiments. As discussed herein, the configuration of drivetrain 140 advantageously provides for the ability to transfer torque from engine(s) 126 to driveshaft 130 at a location 212 of driveshaft 130 that is between the main rotor gearbox 132 and the tail system gearbox 134.

The main rotor driveshaft portion 130a of driveshaft 130 may provide an input to the main rotor gearbox 132 and the tail system driveshaft portion 130b of driveshaft 130 may provide an input to the tail system gearbox 134. Features related to the input gear mesh of main rotor gearbox 132 for transferring torque to main rotor system 110 via rotor mast 116 are not discussed for sake of brevity but would be appreciated by one of ordinary skill in the art.

In at least one embodiment, the input of tail system driveshaft portion 130b into tail system gearbox 134 may be mechanically coupled to an input pinion gear 150. Teeth of input pinion gear 150 may interface with teeth of a spiral bevel gear 152, which may be mechanically coupled to a first output shaft 154 that may transfer torque to anti-torque system 112. Teeth of spiral bevel gear 152 may also interface with an output pinion gear 156, which may be mechanically coupled to a second output shaft 158 that may transfer torque to pusher propeller system 114.

It is to be understood that the example gear mesh of tail system gearbox 134 illustrated in the embodiment of FIG. 2A is only one example of a gear mesh that may be used to transfer torque from an input driveshaft (e.g., driveshaft 130) to an anti-torque system (anti-torque system 112) and/or a pusher propeller system (e.g., pusher propeller system 114) and is not meant to limit the broad scope of the present disclosure. Virtually any gearbox gear meshes that may provide for the ability to transfer torque from an input to outputs may be used and, thus, are clearly within the scope of the present disclosure.

Referring to FIG. 2B, FIG. 2B illustrates other example details that may be associated with drop-down gearbox 128 and overrunning clutch 136, in accordance with certain embodiments. In at least one embodiment, an output 127 from engine(s) 126 may be in mechanical communication with gears 172 of a gear train 170 that may transfer torque from engine(s) 126 to overrunning clutch 136, which for the embodiment of FIG. 2B is a sprag clutch, and driveshaft 130. Overrunning (sprag) clutch 136 may include an outer race 144, which may include gear teeth that are in mechanical communication with a gear 172 of gear train 170, an inner race 176, which may be a portion of driveshaft 130 that passes through the overrunning (sprag) clutch or a component (e.g., a sleeve, a journal of driveshaft 130, grooves of driveshaft 130, etc.) that is part of and/or in mechanical communication with the driveshaft 130, and sprags 178 between the outer race 174 and the inner race 176 that may provide lock-up features for the clutch when torque is provided from engine 126. Overrunning clutch 136 can include any other features such as a retainer spring, cage, etc., as would be appreciated by one of ordinary skill in the art.

Referring again to FIG. 2A, in some embodiments, a clutch 160a may be provided for the main rotor driveshaft portion 130a between the drop-down gearbox 128 and the main rotor gearbox 132. Clutch 160a may provide for the ability to selectively engage or disengage mechanical communication between main rotor gearbox 132 and tail system gearbox 134, which may provide for the ability to operate pusher rotor craft 100 using different autorotation flight modes and/or may provide for eliminating torque being transferred to the main rotor gearbox 134 for cases in which increased torque is to be provided to the pusher propeller system 114. For example, in some cases, a small amount of torque may be transferred to main rotor gearbox 132 even when the main rotor system 110 may be operated in an autorotation state (e.g., power may still be absorbed by gears of the main rotor gearbox due to friction, heat, etc.). Thus, in some embodiments, clutch 160a may be disengaged to eliminate torque being transferred into main rotor gearbox 132 when main rotor system 110 may be operated in an autorotation state; thereby providing for the ability to transfer all the torque from engine(s) 126 to tail system gearbox 134. In various embodiments, clutch 160a may be a 100% lockup clutch or friction clutch or may be an overrunning clutch that may be provided (schematically) in parallel with a lockup or friction clutch in order to lock the main rotor driveshaft portion 130a from slipping in either rotational direction (e.g., clockwise or counter-clockwise) through different pusher rotorcraft 100 operations.

In still some embodiments, clutch 160a may be disengaged to eliminate mechanical communication between main rotor gearbox 132 and tail system gearbox 134 to provide for an autorotation flight mode in which main rotor system 110 may be allowed to rotate faster than anti-torque system 112 and/or pusher propeller system 114 that may be controlled by engine(s) 126 when main rotor system 110 may be operated in an autorotation state. In still some embodiments, clutch 160a may be engaged to maintain mechanical communication between main rotor gearbox 132 and the tail system gearbox to provide for an autorotation flight mode in which autorotation of main rotor system 110 may power rotation of anti-torque system 112 and pusher propeller system 114, as may be needed. For example, in case of a failure of engine(s) 126, gears 152, or some other catastrophic failure associated with power output from engine(s), autorotation of main rotor system 110 may power rotation of anti-torque system 112 and pusher propeller system 114 through overrunning clutch 136.

In still some embodiments, a clutch 160b may be provided for the tail system driveshaft portion 130b between drop-down gearbox 128 and tail system gearbox 134 to provide for the ability to selectively engage or disengage mechanical communication between main rotor gearbox 132 and tail system gearbox 134. In some cases, it may be useful to disengage tail system gearbox 134 from the drivetrain to slow or stop rotation of the anti-torque system 112 and/or the pusher propeller system 114. For example, when pusher rotorcraft 100 is on the ground during egress, rearming, refueling, etc., it may be useful (while main rotor system 110 may still be turning) to slow or stop rotation of the tail systems 112/114 to increase safety for ground personnel. In some embodiments, a brake 162 may be provided on the tail system driveshaft portion 130b between clutch 160b and tail system gearbox 134 to slow or stop rotation of the tail systems 112/114 when clutch 160b is disengaged. In at least one embodiment, brake 162 may be a disc brake system configured to slow or stop rotation of the tail system driveshaft portion 130b when clutch 160b is disengaged. In various embodiments, clutch 160b may be a 100% lockup or friction clutch since the tail system driveshaft portion 130b can carry positive or negative torque to the pusher propeller system 114. For example, negative thrust from the pusher propeller system 114 can be used to slow forward flight for pusher rotorcraft 100, in some embodiments.

In still some embodiments, a clutch 160c may be provided for the first output shaft 154 to provide for the ability selectively engage or disengage mechanical communication between tail system gearbox 134 and anti-torque system 112 for similar purposes, as discussed above. In still some embodiments, a clutch 160d may be provide for the second output shaft 158 to provide for the ability to selectively engage or disengage mechanical communication between tail system gearbox 134 and pusher propeller system 114 for similar purposes, as discussed above. In various embodiments, clutches 160c and 160d may be any combination of 100% lockup or friction clutches. In still some embodiments, a brake (not shown) may be configured for the first output shaft 154 to slow or stop rotation of the anti-torque system 112 when clutch 160c is disengaged and/or a brake (not shown) may be configured for the second output shaft 158 to slow or stop rotation of pusher propeller system 114 when clutch 160d is disengaged. In some embodiments, a clutch (not shown) and/or brake (not shown) may be provided along rotor mast 116 in addition to or in lieu of any other clutch(es) 160a-160d and/or brake(s) that may be provided for pusher rotorcraft 100.

The example clutch and/or brake configurations discussed herein are provided for illustrative purposes only and are not meant to limit the broad scope of the present disclosure. Virtually any clutch and/or brake configuration(s) may be provided for a pusher rotorcraft based on applications and/or implementations and, thus, are clearly within the scope of the present disclosure.

Figure 3A:
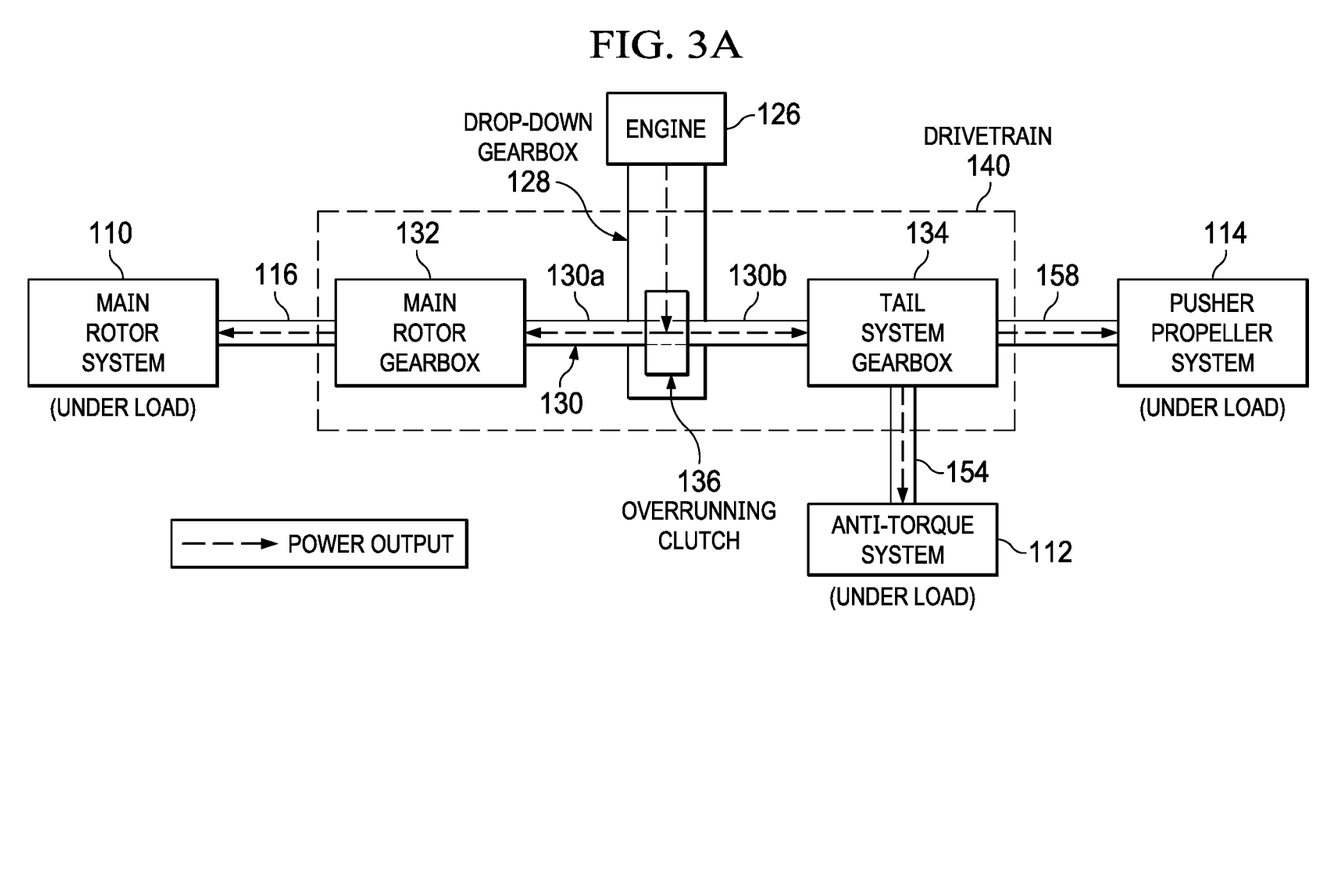
FIGS. 3A-3B are simplified block diagrams illustrating example details that may be associated with the drivetrain of the pusher rotorcraft of FIG. 1, in accordance with certain embodiments.
Figure 3B:
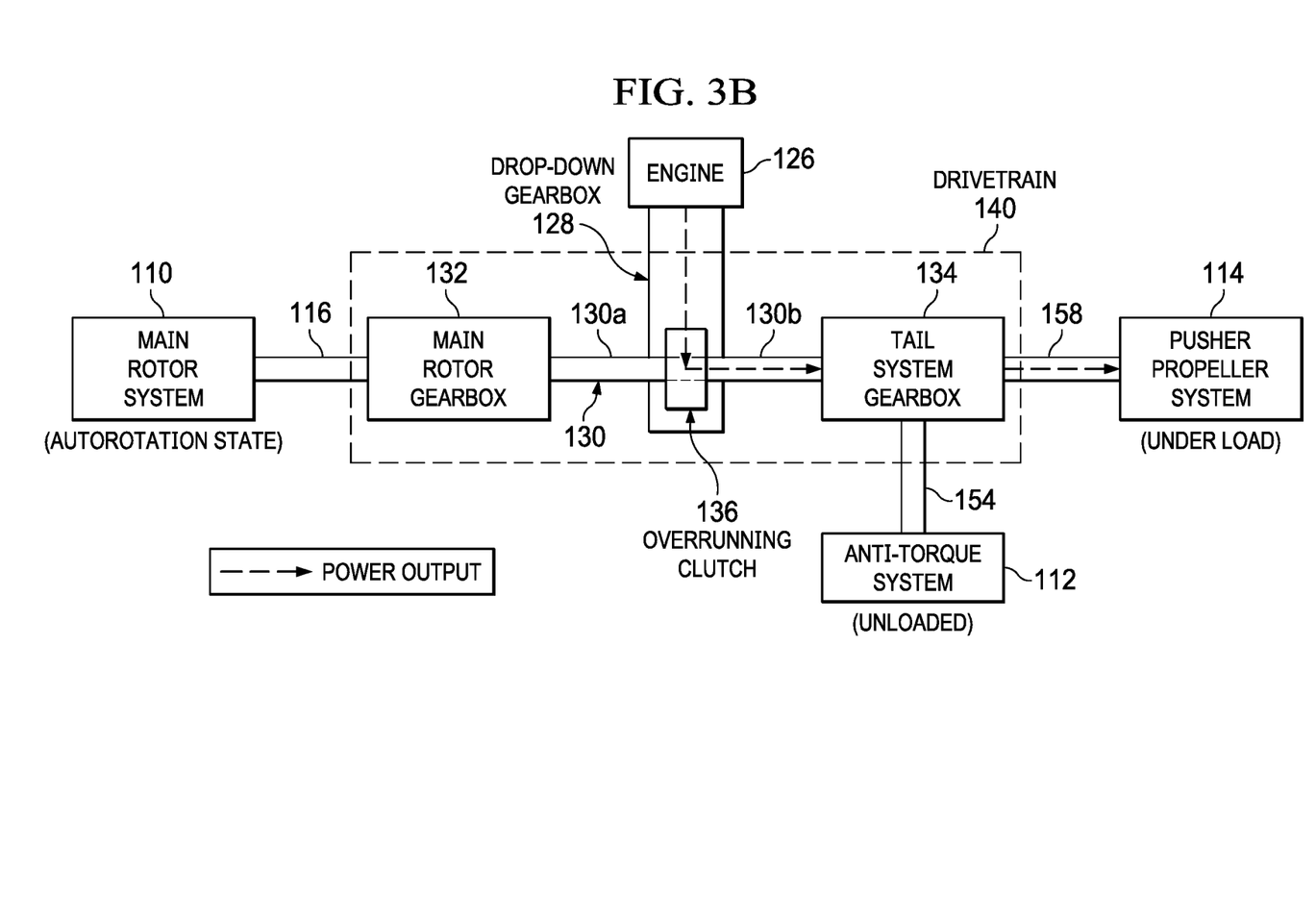

Referring to FIGS. 3A-3B, FIGS. 3A-3B are simplified block diagrams illustrating example details that may be associated with drivetrain 140 of pusher rotorcraft 100, in accordance with certain embodiments. FIGS. 3A-3B include main rotor system 110, anti-torque system 112, pusher propeller system 114, mast 116, and engine(s) 126. Drivetrain 140 including drop-down gearbox 128, main rotor gearbox 132, tail system gearbox 134, and driveshaft 130 (including main rotor driveshaft portion 130a and tail system driveshaft portion 130b) are also shown in FIGS. 3A-3B.

The embodiments of FIGS. 3A-3B illustrate example details that may be associated with power output from engine(s) 126, which may be routed via drop-down gearbox 128 and driveshaft 130, to any combination of main rotor system 110, anti-torque system 112, and/or pusher propeller system 114 based, at least in part, on loading conditions that may be present at the various rotor/propeller systems. In at least one embodiment, loading of main rotor system 110, anti-torque system 112, and/or pusher propeller system 114 may depend, at least in part, on the collective pitch of the blades of the respective rotor/propeller systems.

Consider an example embodiment, as illustrated in FIG. 3A, in which main rotor system 110, anti-torque system 112, and pusher propeller system 114 are under a load (e.g., absorbing power). For the example embodiment of FIG. 3A, power output from engine(s) 126 can be routed forward (e.g., via drop-down gearbox 128, overrunning clutch 136, and main rotor driveshaft portion 130a) to main rotor gearbox 132 and main rotor system 110 and backward (e.g., via drop-down gearbox 128, overrunning clutch 136, and tail system driveshaft portion 130b) to tail system gearbox 134, which can distribute the power to anti-torque system 112 and pusher propeller system 114 based on their respective loading.

Consider another example embodiment, as illustrated in FIG. 3B, in which main rotor system 110 is controlled to be in an autorotation state (e.g., under minimal load), anti-torque system 112 is unloaded (e.g., collective pitch of rotor blades 120 is substantially flat), and pusher propeller system 114 is under a load (e.g., collective pitch of propeller blades 122 is increased). For the example embodiment of FIG. 3B, the majority power output from engine(s) 126 can be routed aft (e.g., via drop-down gearbox 128, overrunning clutch 136, and tail system driveshaft portion 130b) directly to tail system gearbox 134, which can distribute the power to pusher propeller system 114 that is experiencing a load. In some embodiments, as discussed herein, it may be useful to reduce loading on the main rotor/anti-torque systems to direct output power to the pusher propeller system in order to achieve high speed forward flight for a pusher rotorcraft (e.g., pusher rotorcraft 100).

As illustrated in the embodiment of FIGS. 3A-3B, the configuration of drivetrain 140 provides for the ability to route power to any combination of main rotor system 110, anti-torque system 112, and/or pusher propeller system 114 based on the loads that the respective systems may experience during flight. Further, the configuration of drivetrain 140 advantageously provides for the ability to route power directly to tail system gearbox/pusher propeller system 134/114 for embodiments in which main rotor system 110 may be operated in an autorotation state. Thus, the configuration of drivetrain 140 may provide for more efficient power delivery to pusher propeller system 114 in comparison to other drivetrain configurations in which output power is first directed to a main rotor gearbox, through the main rotor gearbox gear mesh, and finally to a tail system gearbox/pusher propeller.

Figure 4:
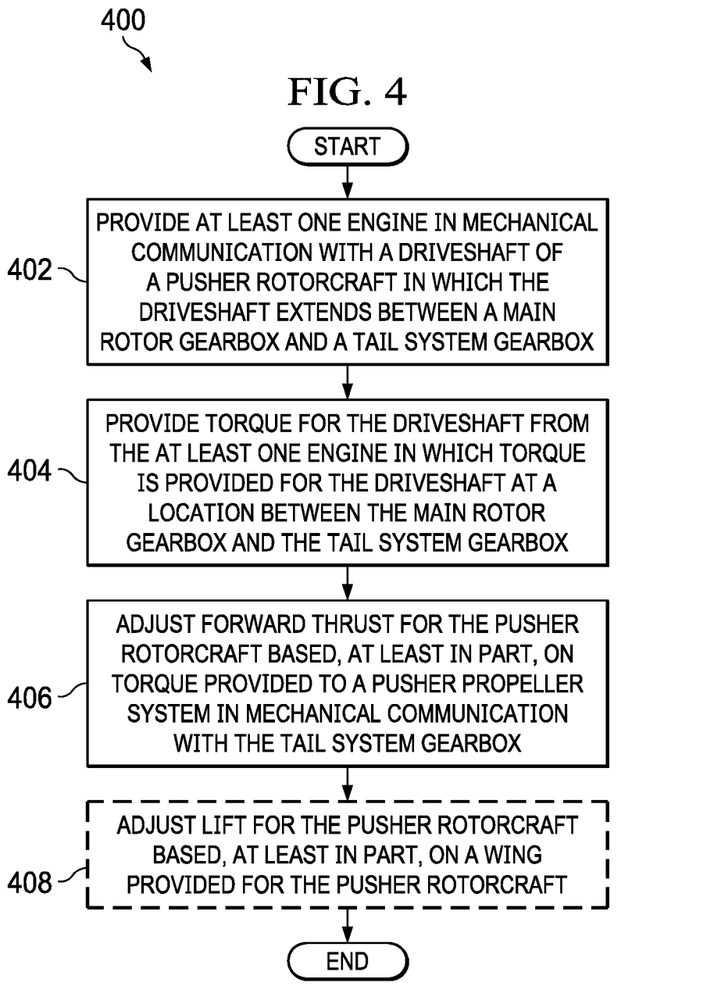
FIG. 4 is a simplified flowchart illustrating example details that may be associated with adjusting forward thrust of a pusher rotorcraft, in accordance with certain embodiments.

Referring to FIG. 4, FIG. 4 is a simplified flowchart 400 illustrating example details that may be associated with adjusting forward thrust for a pusher rotorcraft (e.g., pusher rotorcraft 100), in accordance with certain embodiments. In at least one embodiment, flowchart 400 may begin at block 402 by providing at least one engine in mechanical communication with a driveshaft of a pusher rotorcraft in which the driveshaft extends between a main rotor gearbox and a tail system gearbox for the pusher rotorcraft. The flowchart may proceed to block 404 by providing torque for the driveshaft from the at least one engine in which the torque is provided for the driveshaft at a location of the driveshaft between the main rotor gearbox and the tail system gearbox. The flowchart may proceed to block 406 by adjusting forward thrust for the pusher rotorcraft based, at least in part, on torque provided to a pusher propeller system in mechanical communication with the tail system gearbox.

For example, in at least one embodiment, the main rotor gearbox may be in mechanical communication with a main rotor system, which may be operated in an autorotation state. Torque provided to the main rotor gearbox may be decreased and torque provided to the tail system gearbox and the pusher propeller system may be increased when the main rotor system is operated in an autorotation state. Thus, power provided to the pusher propeller system may be increased when the main rotor system is operated in an autorotation state; thereby providing for the ability to achieve high forward speed flight for the pusher rotorcraft.

In at least one embodiment, the flowchart may proceed to block 408 by adjusting lift for the pusher rotorcraft during forward flight based, at least in part, on a wing provided for the pusher rotorcraft.

Figure 5:
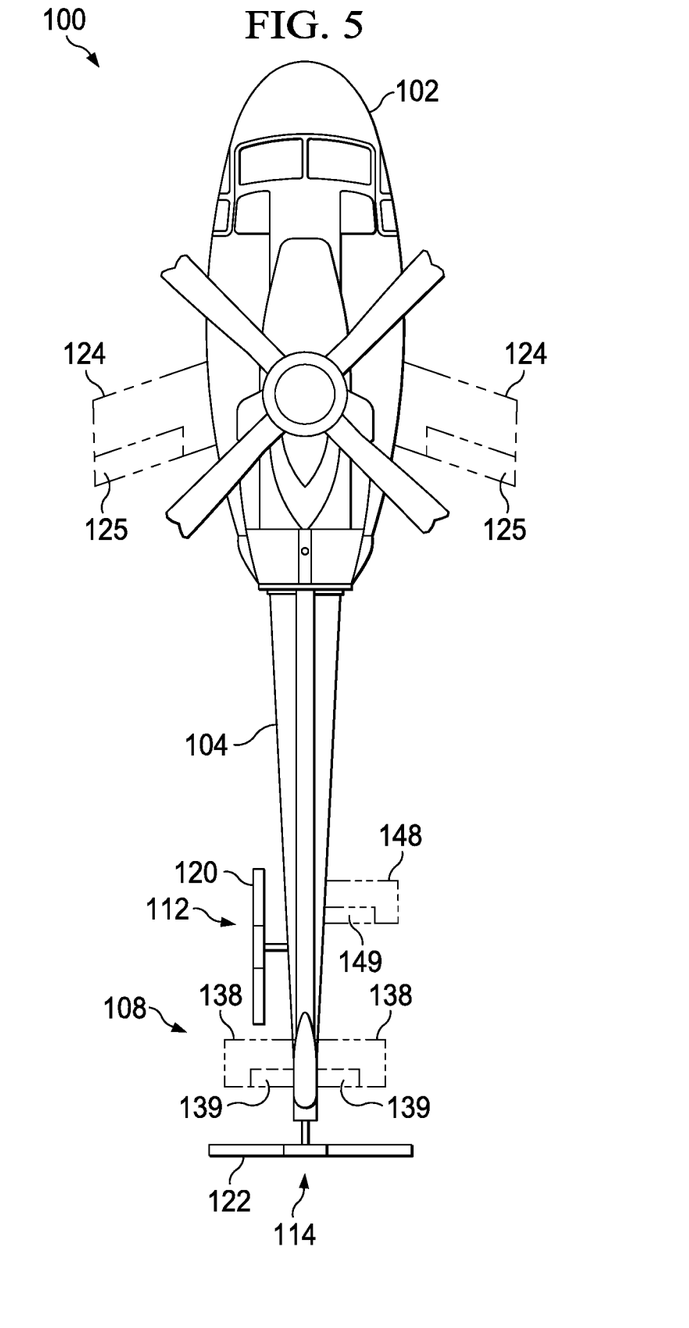
FIG. 5 is a simplified top view diagram illustrating other example details that may be associated with a pusher rotorcraft, in accordance with certain embodiments.

Referring to FIG. 5, FIG. 5 is a top view diagram illustrating other example details that may be associated with pusher rotorcraft 100, in accordance with certain embodiments. In some embodiments, pusher rotorcraft 100 may include wings 124 configured along sides of fuselage 102. Wings 124 may include one or more moveable control surfaces 125, in some embodiments. In still some embodiments, pusher rotorcraft 100 may include one or more horizontal stabilizer(s) 138 configured for one or both side(s) of tail structure 108. Horizontal stabilizer(s) 138 may include elevator(s) 139 in some embodiments. In still some embodiments, pusher rotorcraft 100 may include one or more horizontal stabilizer(s) 148 configured for one or both sides of empennage 104. Horizontal stabilizer(s) 148 may include elevator(s) 149 in some embodiments.

It is to be understood that example wing, tail structure, and/or stabilizer location(s) and/or configuration(s) (e.g., size, dimensions, etc.) illustrated for various embodiments discussed herein are only a few of the many possible location(s) and/or configuration(s) that may be provided for a pusher rotorcraft and are not meant to limit the broad scope of the present disclosure. Virtually any wing, tail structure, and/or stabilizer location(s) and/or configuration(s) may be provided for a pusher rotorcraft based on applications and/or implementations and, thus, are clearly within the scope of the present disclosure.

The flowcharts and diagrams in the FIGURES illustrate the architecture, functionality, and operation of possible implementations of various embodiments of the present disclosure. It should also be noted that, in some alternative implementations, the function(s) associated with a particular block may occur out of the order specified in the FIGURES. For example, two blocks shown in succession may, in fact, be executed substantially concurrently, or the blocks may sometimes be executed in the reverse order or alternative orders, depending upon the functionality involved.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments.

As used herein, unless expressly stated to the contrary, use of the phrase 'at least one of', 'one or more of' and 'and/or' are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. As referred to herein, 'at least one of', 'one or more of', and the like can be represented using the '(s)' nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A rotorcraft comprising:
   at least one engine in mechanical communication with a drop-down gearbox;
   a driveshaft in mechanical communication with the drop-down gearbox, a main rotor gearbox, and a tail system gearbox;
   a main rotor system in mechanical communication with the main rotor gearbox;
   an anti-torque system in mechanical communication with the tail system gearbox; and
   a pusher propeller system in mechanical communication with the tail system gearbox;
   wherein the tail system gearbox further includes:
      an input pinion gear in mechanical communication with the driveshaft;
      a spiral bevel gear in mechanical communication with a first output shaft; and
      an output pinion gear in mechanical communication with a second output shaft.

2. The rotorcraft of claim 1, further comprising:
   a fuselage, wherein the fuselage comprises a wing.

3. The rotorcraft of claim 2, wherein the wing comprises one or more moveable portions.

4. The rotorcraft of claim 1, wherein the drop-down gearbox comprises an overrunning clutch in mechanical communication with the driveshaft.

5. The rotorcraft of claim 4, wherein the overrunning clutch is a sprag clutch.

6. The rotorcraft of claim 1, wherein the pusher propeller system comprises a plurality of adjustable pitch propeller blades.

7. The rotorcraft of claim 1, wherein the first output shaft is operable to rotate the anti-torque system.

8. The rotorcraft of claim 1, wherein the second output shaft is operable to rotate the pusher propeller system.

9. The rotorcraft of claim 1, further comprising a clutch in mechanical communication with the driveshaft between the drop-down gearbox and the main rotor gearbox.

10. The rotorcraft of claim 1, further comprising a clutch in mechanical communication with the driveshaft between the drop-down gearbox and the tail system gearbox.

11. A method comprising:
    providing at least one engine in mechanical communication with a driveshaft of a pusher rotorcraft, wherein the driveshaft extends between a main rotor gearbox and a tail system gearbox;
    providing torque for the driveshaft, wherein the torque is provided for the driveshaft at a location of the driveshaft between the main rotor gearbox and the tail system gearbox; and
    adjusting forward thrust for the pusher rotorcraft based, at least in part, on torque provided to a pusher propeller system in mechanical communication with the tail system gearbox;
    wherein the tail system gearbox further includes:
       an input pinion gear in mechanical communication with the driveshaft;
       a spiral bevel gear in mechanical communication with a first output shaft; and
       an output pinion gear in mechanical communication with a second output shaft.

12. The method of claim 11, wherein the main rotor gearbox is in mechanical communication with a main rotor system, the main rotor system comprising a plurality of rotor blades.

13. The method of claim 12, further comprising:
operating the main rotor system in an autorotation state.

14. The method of claim 13, wherein torque provided to the main rotor gearbox is decreased when the main rotor system is operating in the autorotation state.

15. The method of claim 13, wherein torque provided to the pusher propeller system is increased when the main rotor system is operating in the autorotation state.

16. The method of claim 11, wherein torque is provided for the driveshaft by an overrunning clutch in mechanical communication with the driveshaft and the at least one engine.

17. The method of claim 11, further comprising:
adjusting lift for the pusher rotorcraft based, at least in part, on a wing provided for the pusher rotorcraft.

18. A rotorcraft drivetrain comprising:
a first gearbox in mechanical communication with at least one engine;
a second gearbox in mechanical communication with a main rotor system;
a third gearbox in mechanical communication with an anti-torque system and a pusher propeller system; and
a driveshaft, wherein the driveshaft is in mechanical communication with the first gearbox, the second gearbox, and the third gearbox;
wherein the third gearbox further includes:
an input pinion gear in mechanical communication with the driveshaft;
a spiral bevel gear in mechanical communication with a first output shaft; and
an output pinion gear in mechanical communication with a second output shaft.

19. The rotorcraft drivetrain of claim 18, wherein the first gearbox provides torque for the driveshaft at a location of the driveshaft between the second gearbox and the third gearbox.

* * * * *